United States Patent
Ungerathen

(10) Patent No.: US 8,397,599 B2
(45) Date of Patent: Mar. 19, 2013

(54) SHIFT PAD FOR A SHIFT ELEMENT IN A GEAR SHIFT DEVICE, AND SHIFT ELEMENT COMPRISING SUCH A SHIFT PAD

(75) Inventor: Ingo Ungerathen, Swisttal (DE)

(73) Assignee: Getrag Ford Transmissions GmbH, Cologne (DE)

( * ) Notice: Subject to any disclaimer, the term of this patent is extended or adjusted under 35 U.S.C. 154(b) by 597 days.

(21) Appl. No.: 12/623,816

(22) Filed: Nov. 23, 2009

(65) Prior Publication Data

US 2010/0132498 A1    Jun. 3, 2010

(30) Foreign Application Priority Data

Dec. 1, 2008   (DE) .................. 10 2008 059 827

(51) Int. Cl.
*B60K 20/00*   (2006.01)
*F16H 59/04*   (2006.01)
(52) U.S. Cl. .................................. 74/473.36
(58) Field of Classification Search ............... 74/473.36, 74/473.37
See application file for complete search history.

(56) References Cited

U.S. PATENT DOCUMENTS

| | | | | |
|---|---|---|---|---|
| 4,529,080 | A | * | 7/1985 | Dolan ..................... 192/109 A |
| 5,027,672 | A | * | 7/1991 | Salvatori et al. ........... 74/473.37 |
| 6,164,151 | A | * | 12/2000 | Dutson et al. ............. 74/473.37 |
| 2008/0314187 | A1 | * | 12/2008 | Keller et al. .............. 74/473.36 |

FOREIGN PATENT DOCUMENTS

| | | |
|---|---|---|
| DE | 19926248 | 12/2000 |
| DE | 102008059827 | 5/2012 |

* cited by examiner

*Primary Examiner* — Justin Krause

(74) *Attorney, Agent, or Firm* — Schlee IP International, P.C.; Alexander R. Schlee

(57) ABSTRACT

A shift pad for a gear shift element is described, comprising: a pad section that is configured to engage a circular groove of a gear shift sleeve; a locking section for securing the shift pad to the gear shift element; and a locking element that is connected to the locking section in a fixed manner and is adapted to be subjected to plastic deformation for securing the shift pad to the gear shift element. Further, a gear shift element for a gear shift device comprising the above shift pad is described. Detaching of the shift pad from the shift element during the transportation or the assembly process is prevented by this design.

19 Claims, 3 Drawing Sheets a b a b a b a b

SHIFT PAD FOR A SHIFT ELEMENT IN A GEAR SHIFT DEVICE, AND SHIFT ELEMENT COMPRISING SUCH A SHIFT PAD

CROSS REFERENCE TO RELATED APPLICATION

This application claims the priority right from the German patent application DE 102008059827.5 that was filed on Dec. 1, 2008, the content of which is herewith incorporated in its entirety by reference.

BACKGROUND OF THE INVENTION

The invention relates to a shift pad for a shift element in a gear shift device, in particular for a motor vehicle transmission, as well as a shift element comprising such a shift pad.

Such shift pads are in particular used in connection with gear shift forks in gear shift devices of motor vehicle gear shift transmissions. In this connection, the gear shift fork engages via the shift pads respective circular grooves of a gear shift sleeve. During the gear shifting action an axial shifting force is applied via the shift pads from the gear shift fork onto a gear shift sleeve that this supported on a shaft, wherein a positive interlocking between the shaft and the loose wheel supported on said shaft is created.

It is known to manufacture shift pads from plastic that are relatively resistant against wear and comprises good sliding properties. From the DE 19926248 B4 a shift pad of a shift element in a gear shift device of a motor vehicle is known. The shift pad is formed integrally from plastic material and comprises a reinforcement made from sheet metal. For connecting the shift pad to the gear shift fork, an insertable element is provided that can be inserted into a through hole of the gear shift fork. For securing the insertable element against losing, the free end comprises a snap-in element that engages a wall of the gear shift fork in radial direction from behind. This prevents that the shift pad falls out of the gear shift fork during transportation or during the assembly process of the gear shift device. The insertable element and the snap-in element have to be manufactured precisely within narrow tolerances and need to fit each other for providing the desired snap-in connection. However, this is very difficult to manufacture.

SUMMARY OF THE INVENTION

Starting from this aforementioned design, it is an object of the invention to create a shift pad for a shift element in a gear shift device, in particular for a motor vehicle, wherein the gear shift element can be connected in a simple manner and detaching of the shift pad during the transportation or the assembly process is prevented. The shift pad should further be manufactured at low costs and in a simple manner. The object is further to create a gear shift element comprising such a shift pad.

The solution is a shift pad for a shift element, comprising a pad section that is configured to engage a circular groove of a gear shift sleeve, a locking section for securing the shift pad to the gear shift element, and a locking element that is connected to the locking section in a fixed manner and is adapted to be subjected to plastic deformation for securing the shift pad to the gear shift element.

DETAILED DESCRIPTION OF THE INVENTION

The shift pad according to the invention has the advantage that it can be connected in an easy manner with the shift element, for instance a gear shift fork. The locking element provides a security against losing that can be handled in an easy manner, so that the shift pad cannot detach from the gear shift element unintentionally after the assembly and during the transportation. Since the locking element is also a fixed part of the shift pad, it can be handled easily during the assembly process. In particular, separate component parts for securing the shift pad are not necessary.

According to a preferred embodiment, the shift pad comprises a base body made from plastic, the base body forming the pad section and the locking section. Preferably, the reinforcement is embedded into the plastic for reinforcing the base body, or in other words, the plastic material might be provided by injection molding around the reinforcement. The reinforcement does therefore create kind of a core of the shift pad. The reinforcement guarantees that the shift pad is of high strength and rigidity. Further, the reinforcement provides for a secure guidance of the gear shift sleeve by means of the shift pad and the forces acting upon the shift pad are borne by the gear shift sleeve. Preferably, this reinforcement is integrally formed from metal material, wherein in particular steel material of high strength is suitable. However, also other materials like fiber glass reinforced plastics can be used.

According to a preferred embodiment, also the locking element is made from a metal material. The locking element can generally be of any desirable shape, for example of the shape of a wire or of a strip. Preferably, one first end of the locking element is embedded into the base body made from the plastic. This provides a secure connection between the locking element and the shift pad. A particularly secure connection of the locking element in the shift pad is achieved by supporting the locking element at the reinforcement by engaging the reinforcement from behind and/or by fixing it to the reinforcement. The opposite, free end of the locking element protrudes beyond the front face of the locking section. After the shift pad has been inserted into the shift element, the aforementioned free end of the locking element is bent resulting in a plastic deformation and therefore engaging around a back wall section of the shift element. This secures the shift pad against loosening.

According to a particularly preferable embodiment, the locking element is at first manufactured as a separate component part and is then embedded into the plastic by injection molding of the plastic around it. Preferably, the reinforcement is made from sheet metal by metal forming, i.e. plastic deformation in a metal forming process, comprising a first leg, a U-shaped reversing section and a second leg connecting thereto. For support the locking element engages with its free end behind the U-shaped section of the reinforcement, wherein the locking element may be a wire or a metal sheet element.

According to a further embodiment wherein the locking element is likewise at first manufactured as a separate component part, the locking element comprises a hole allowing to insert the reinforcement through this hole. Both parts, i.e. the reinforcement and the locking element, are then subsequently embedded into plastic by injection molding, so that these are embedded as a result into the base body made from plastic.

The locking element can be fixed to the reinforcement, and can in particular be integrally formed with the reinforcement. This embodiment has the advantage of further decreasing the number of component parts and does therefore have a particularly simple structure. In this embodiment, the reinforcement has preferably two legs and one holding section protruding therefrom, and the locking element is connected integrally to the holding section. However, it is also possible that the locking element is connected integrally to the reinforcement that is manufactured by metal forming or is formed by the reversing section of the reinforcement. For keeping the forces low that are necessary for deforming the locking element it is preferable if a section of constricted cross-section is provided between the holding section and the locking element. The section of constricted cross-section can in particular be formed as a groove.

The unit manufactured according to one of the above embodiments comprising the base body made of plastic, the reinforcement and the locking element is subsequently connected to the shift element, in particular a gear shift fork. For achieving a simple connection it is advantageous if the locking section of the shift pad comprises a cylindrical outer surface. The locking section comprises the reversing section or holding section of the reinforcement providing a stabilizing effect and good force bearing properties for bearing gear shift fork forces.

The solution for the object above is further including a shift element for a gear shift device, in particular for a motor vehicle transmission, said gear shift element comprising two legs that oppose each other and are connected to each other, and have a shift pad according to one of the embodiments described above attached to each one of the legs.

Preferably, the shift pads are inserted by means of their respective locking sections through respective holes in the respective legs of the gear shift element and are secured by plastic deformation to the locking element wherein the locking element engages in its deformed configuration behind a wall section of the respective legs.

BRIEF DESCRIPTION OF THE DRAWINGS

Preferred embodiments are in the following discussed by referring to the drawings. In the drawings show:

FIG. 1 a shift pad according to a first embodiment of the invention wherein FIG. 1a shows the shift pad in a perspective view and FIG. 1b shows the reinforcement of the shift pad, likewise in a perspective view;

FIG. 2 a shift pad according to a second embodiment of the invention wherein FIG. 2a shows the shift pad in a perspective view and FIG. 2b shows the reinforcement of the shift pad, likewise in a perspective view;

FIG. 3 a shift pad according to a third embodiment of the invention wherein FIG. 3a shows the shift pad in a perspective view and FIG. 3b shows the reinforcement of the shift pad, likewise in a perspective view;

FIG. 4 a shift pad according to a fourth embodiment of the invention wherein FIG. 4a shows the shift pad in a perspective view and FIG. 4b shows the reinforcement of the shift pad, likewise in a perspective view;

DETAILED DESCRIPTION OF THE DRAWINGS

Figure 1:
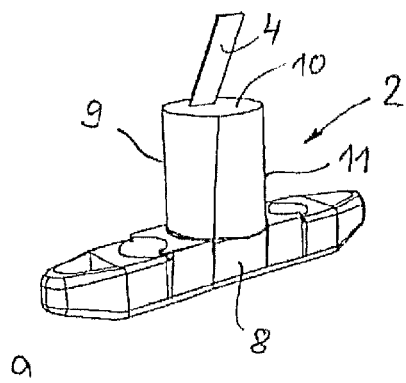
Figure 1:
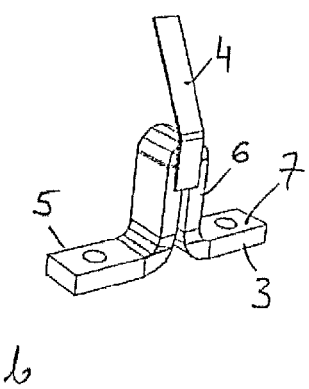

FIG. 1 shows a shift pad 2 according to the first embodiment of the present invention. This shift pad comprises reinforcement 3 as shown in FIG. 1b, and comprises a locking element 4. The reinforcement 3 and in part the locking element 4 are embedded in molded in plastic, wherein FIG. 1a shows the plastic housing embedding the reinforcement and shows a part of the locking element that has not been embedded in the molded plastic.

The reinforcement 3 that has been preferably manufactured by metal forming of sheet metal comprises a first leg 5, a U-shaped reversing section 6 and a second leg 7. The two legs 5, 7 together with the plastic surrounding these form a pad section 8 of the shift pad 2, while the reversing section 6 together with the plastic surrounding this reversing section forms an attachment section 9. The pad section 8 is configured for engaging a respective circular groove of a sliding sleeve while the attachment section 9 is configured for attaching the shift pad to the gear shift element.

In the present embodiment, the locking element 4 has the shape of a strip, particularly made from a sheet metal that is in contact with the U-shaped reversing section 6. The locking element 4 is embedded by injection molding together with the reinforcement 3 by plastic, so that a durable connection of the locking element is provided by embedding it in the plastic by injection molding. In addition, the strip can be shaped such that it engages the U-shaped reversing section 6 from behind, making the connection between the elements even stronger. It is noted that the locking element 4 protrudes beyond the front face 10 of the locking section 9. The length of the locking element is chosen such that in the bent configuration of the locking element the locking element protrudes beyond the outer surface 11 of the locking section 9 in a radial direction.

Figure 2:
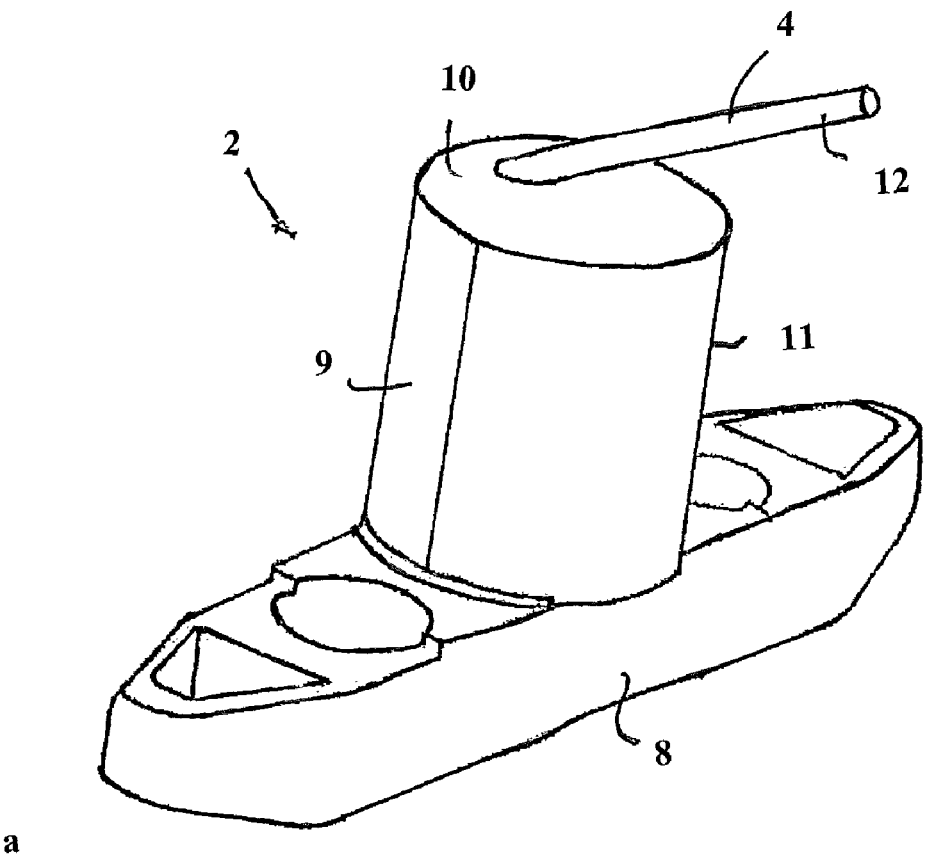
Figure 2:
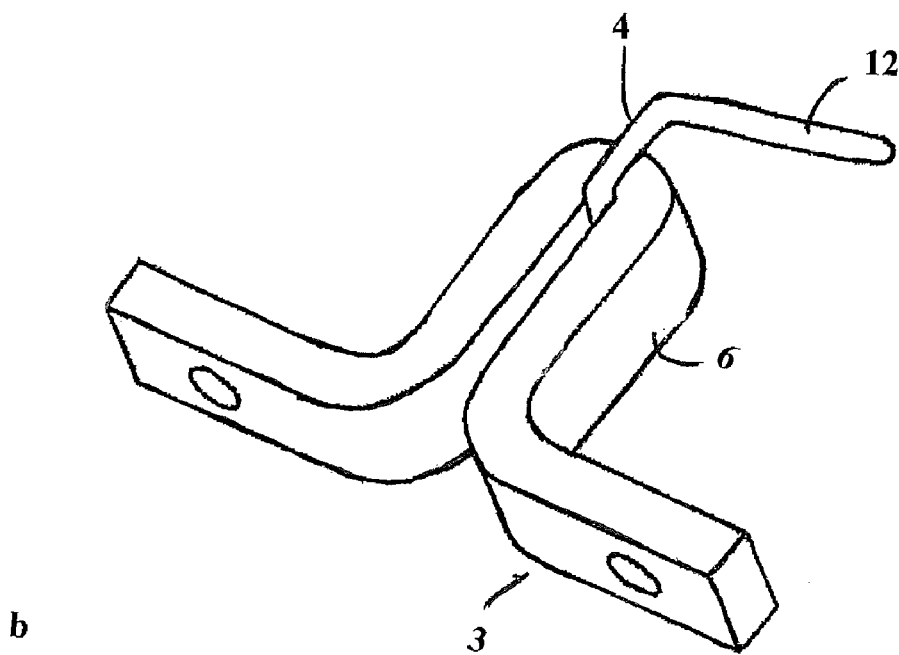

FIG. 2 shows a shift pad 2 according to another embodiment that is substantially the same as the one shown in FIG. 1. Regarding the similarities, it is referred to the description above, wherein the same or equivalent components are designated by the same reference numerals. In the following, only the differences are discussed. This applies also to all other further figures.

It is apparent that the locking element 4 according to the embodiment shown in FIG. 2 is wire-shaped. The wire reaches at its end that is adjacent to the shift pad into an opening formed in the U-shape reversing section 6 of the reinforcement 3, creating a positive interlocking between the aforementioned component parts. The opposite, free end 12 of the wire protrudes beyond the front face 10 of the attachment section 9 in a similar fashion as it has been the case in the above first embodiment.

Figure 3:
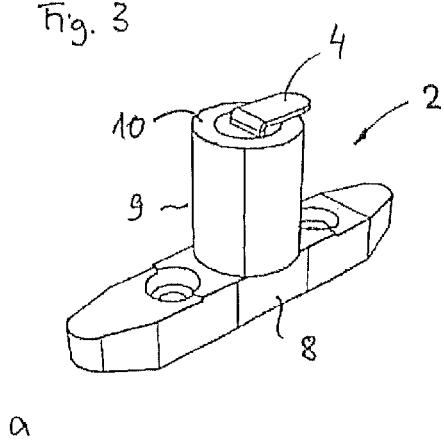
Figure 3:
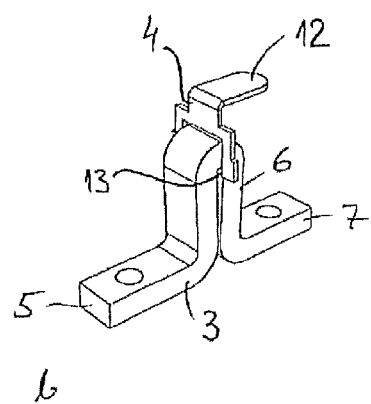

FIG. 3 shows the shift pad according to the invention according to a further embodiment. This embodiment comprises a through hole 13 (see FIG. 1b) in the locking element 4, by means of which through hole the reinforcement 3 is inserted by means of its reversing section 6. The free end 12 of the locking element 4 that is in particular made by metal forming from sheet metal is shaped as a shackle that protrudes beyond the front face 10.

Figure 4:
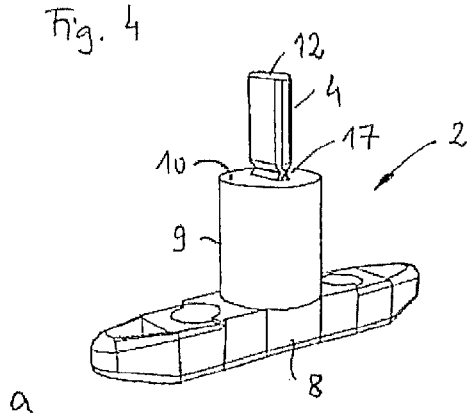
Figure 4:
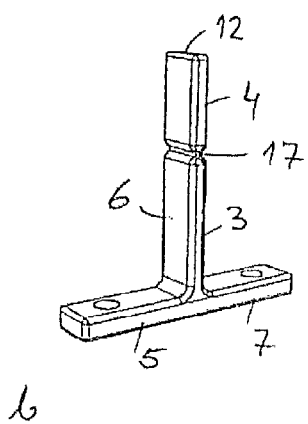

The embodiment shown in FIG. 4 distinguishes in that the reinforcement 3 and the locking element 4 are integrally formed. It can be gathered particularly from FIG. 4b that the reinforcement 3 as a whole is shaped approximately T-shaped and comprises a holding section 6 projecting vertically from the two legs 5, 7 and forms a core of the attachment section 9. A holding section 6 is formed that is connected integrally to the adjacent locking element 4, wherein a constricted section 17 is formed in the transitional area between the holding section 6 and the locking element 4. The constricted section 17 is approximately in the plane of the front face 10 so that at this location a predetermined bending location for securing the shift pad to the gear shift element 15 is formed. Also in this case, the length of the locking element is chosen such that in the bent configuration a free end 12 protrudes beyond the cylindrical outer face 11 of the locking section 9.

All of the shift pads that have been described above provide the advantage that these can be attached easily to the gear shift element 15. The shift pad 2 forms together with the reinforcement and the locking element 4 one component unit that can be mounted in a simple manner. The locking element 4 is a fixed part of the shift pad 2 and does therefore provide a safeguard against losing that can be handled easily so that the shift pad does not detach and get lost after mounting and during transportation.

Figure 5:
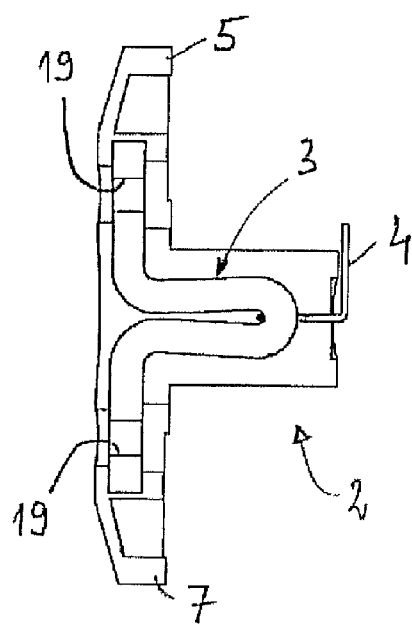
FIG. 5 the shift pad according to FIG. 2, but in a sectional view.

FIG. 5 shows the embodiment according to FIG. 2 as a sectional view. Through holes 19 are provided in the legs 5, 7 and provide openings for receiving aligning pins that allow fixing of the reinforcement 3 during the injection molding process in the desired position when embedding in plastic. Therefore, the position of the reinforcement is predefined in relation to the plastic housing.

Figure 6:
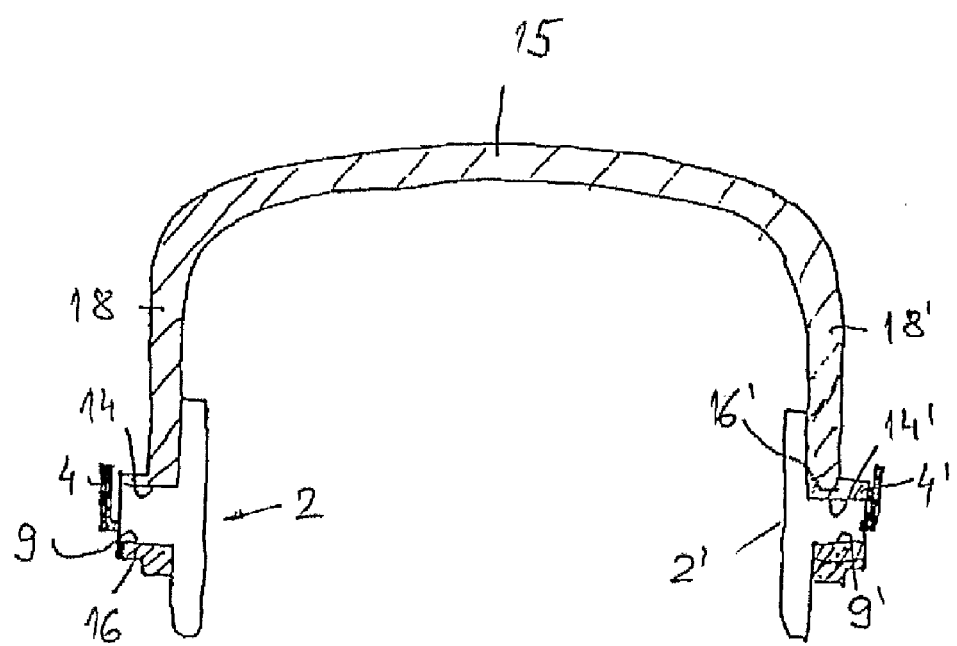
FIG. 6 a shift element provided with the shift pad according to the present invention.

FIG. 6 shows the gear shift element 15 according to the invention in the form of a gear shift fork. The gear shift fork 15 is approximately C-shaped and comprises two free ends 18, 18' on opposite sides. In each one of the ends 18, 18' a hole 14, 14' is provided, said holes opposing each other. In each one of the holes 14, 14' the shift pad 2, 2' according to the invention is inserted, wherein the locking section 9 is inserted into the hole 14. After inserting the shift pad to into the hole 14 the locking element 4 is deformed plastically by bending it so that it protrudes beyond the wall section 16, 16' that surrounds the hole. In this manner, the locking element 4, 4' encloses the wall section 16, 16' so that the shift pad is secured reliably against detaching during the transport or during the assembly. If needed, the shift pad can be disassembled in an easy manner by a bending the free end of the locking element 4, 4' back so that the shift pad 2, 2' can be pulled out of the respective hole 14, 14' of the gear shift element 15. The shift pad 2, 2' can be any of the embodiments shown in FIG. 1-4.

LIST OF REFERENCE NUMERALS 2 shift pad
3 reinforcement
4 locking element
5 leg
6 reversing section
7 leg
8 pad section
9 locking section
10 front face
11 outer face
12 free end
13 through hole
14 hole
15 gear shift element
16 wall
17 constricted section
18 end
19 through hole

What is claimed is:

1. A shift pad for a gear shift element, comprising:
  a pad section that is configured to engage a circular groove of a gear shift sleeve;
  a locking section for securing the shift pad to the gear shift element, said locking section comprising an outer surface and a front face; and
  a locking element made from a metallic material that is connected to the locking section in a fixed manner and is adapted to be subjected to plastic deformation to assume a bent configuration for securing the shift pad to the gear shift element; wherein
  the locking element protrudes beyond the front face of the locking section; and
  the locking element protrudes in the bent configuration beyond the outer surface of the locking section.

2. The shift pad according to claim 1, comprising a base body made from plastic, the base body forming the pad section and the locking section.

3. The shift pad according to claim 1, wherein the reinforcement is formed integrally from metallic material.

4. The shift pad according to claim 1, wherein the locking element is wire-shaped.

5. The shift pad according to claim 1, wherein the locking element is strip-shaped and therefore wider than thick.

6. The shift pad according to claim 1, comprising a reinforcement that is embedded into the plastic.

7. The shift pad according to claim 6, wherein the locking element is embedded into a base body made from plastic.

8. The shift pad according to claim 6, wherein the locking element is supported by the reinforcement.

9. The shift pad according to claim 6, wherein the locking element comprises a free end that engages behind a U-shaped section of the reinforcement.

10. The shift pad according to claim 6, wherein the locking element comprises a hole that is penetrated by the reinforcement.

11. The shift pad according to claim 6, wherein the locking element is in a fixed connection with the reinforcement.

12. The shift pad according to claim 6, wherein the locking element is integrally formed with the reinforcement.

13. The shift pad according to claim 12, wherein the reinforcement comprises two legs and one holding section protruding therefrom, and said holding section is integrally connected at its end with the locking element.

14. The shift pad according to claim 13, wherein a constricted section is provided between the holding section and the locking element.

15. The shift pad according to claim 14, wherein said constricted section is formed as a groove.

16. The shift pad according to claim 1, wherein the locking section comprises a cylindrical outer face.

17. Gear shift element for a gear shift device, said gear shift element comprising two ends that oppose each other and are connected to each other, wherein to each one of the two ends a shift pad is attached that comprises:
  a pad section that is configured to engage a circular groove of a gear shift sleeve;
  a locking section for securing the shift pad to the gear shift element, said locking section comprising an outer surface and a front face; and
  a locking element made from a metallic material that is connected to the locking section in a fixed manner and is adapted to be subjected to plastic deformation to assume a bent configuration for securing the shift pad to the gear shift element; wherein
  the locking element protrudes beyond the front face of the locking section; and
  the locking element protrudes in the bent configuration beyond the outer surface of the locking section.

18. The gear shift element according to claim 17, wherein the shift pads each comprise a locking section that is inserted through respective holes of the gear shift element and secured by plastic deformation to the locking element that engages in its deformed configuration behind a wall section of the gear shift element.

19. The gear shift element according to claim 17, wherein the gear shift device is part of a motor vehicle transmission.

* * * * *